US007058145B2

(12) United States Patent
Wengler (10) Patent No.: US 7,058,145 B2
(45) Date of Patent: Jun. 6, 2006

(54) DIVERSITY GAIN WITH A COMPACT ANTENNA

(75) Inventor: Michael J. Wengler, Carlsbad, CA (US)

(73) Assignee: Qualcomm, Inc., San Diego, CA (US)

( * ) Notice: Subject to any disclaimer, the term of this patent is extended or adjusted under 35 U.S.C. 154(b) by 718 days.

(21) Appl. No.: 09/874,661

(22) Filed: Jun. 4, 2001

(65) Prior Publication Data

US 2002/0181627 A1 Dec. 5, 2002

(51) Int. Cl.
*H04L 1/02* (2006.01)

(52) U.S. Cl. .................................................. 375/347
(58) Field of Classification Search ............... 375/316, 375/346–347, 140–144
See application file for complete search history.

(56) References Cited

U.S. PATENT DOCUMENTS

| 5,901,174 | A | * | 5/1999 | Richard ....................... 375/229 |
| 5,905,467 | A | | 5/1999 | Narayanaswamy et al. |
| 6,205,166 | B1 | * | 3/2001 | Maruta et al. ............... 375/130 |
| 6,369,758 | B1 | * | 4/2002 | Zhang ......................... 342/383 |
| 2002/0013164 | A1 | * | 1/2002 | Leifer et al. ................. 455/562 |
| 2003/0078075 | A1 | * | 4/2003 | McNicol ...................... 455/562 |

FOREIGN PATENT DOCUMENTS

| EP | 1091447 A1 | 4/2001 |
| WO | 9409568 | 4/1994 |
| WO | 9724818 | 7/1997 |
| WO | 99/27659 | 6/1999 |

OTHER PUBLICATIONS

J. Liberti, Jr. et al. "Smart Antennas for Wireless Communications," IS-95 and Third Generation CDMA Applications, CH. 3, Prentice Hall PTR, Upper Saddle River, NJ 07458 (pp. 101-111).
J. Liberti, Jr. et al. "Smart Antennas for Wireless Communications," IS-95 and Third Generation CDMA Applications, CH. 8, Prentice Hall PTR, Upper Saddle River, NJ 07458 (pp. 215-251).

* cited by examiner

*Primary Examiner*—Kevin Burd
(74) *Attorney, Agent, or Firm*—Philip Wadsworth; Sandra L. Godsey; Thomas R. Rouse (57) ABSTRACT

A receiver chain (53) for use in a wireless communication system includes a compact, highly correlated, multi-element antenna. The multiple antenna elements (34) and (35) are configured to receive a signal from at least one base station. The highly correlated signals output from the antenna elements (34 and 35) are optimally combined in a controller (55) using a set of weighting factors. The set of weighting factors for each base station signal is determined in response to the spatial signatures of the received signals.

34 Claims, 7 Drawing Sheets

DIVERSITY GAIN WITH A COMPACT ANTENNA

BACKGROUND

1. Field

The invention relates generally to wireless communications systems, and more specifically to interference cancellation from received signals in a wireless communication system.

2. Background

A typical wireless communication system will include multiple remote stations and multiple base stations. In general, the communication system is bi-directional, with the remote station receiving signals from the base station as well as the remote station transmitting signals to the base station. To facilitate receiving and transmitting signals over the wireless communication channel the remote station includes a receiver, and a transmitter.

A function of the receiver in the remote station is to maximize the amount of desired signal received, while minimizing the amount of any undesired, or interference, signals received. Typically, the desired signals are radio waves arriving from one (1) sector of a three (3) sector base station in close proximity to the remote station. The desired signal carries on it the information that the remote station will decode and use. The undesired, or interference, signals include signals arriving from the other two (2) sectors of the base station "leaking" into the serving sector. In addition, the undesired, or interference signal may be from entirely different base stations that are located near by that are carrying carry information intended for use by other remote stations in the communication system. Signals received by a remote station that are intended for other remote stations interfere with the reception of the desired signal by the remote station making it more difficult to decode the desired signal.

Undesired effects include "interference" and "fading." Interference refers to all the undesired power that is "pickup" by the receiver in the remote station. Fading is essentially a kind of self-interference due to the multipath characteristic of a wireless channel. Typically, the desired signal will arrive at the remote station along many paths, due to the desired signal radio waves "bouncing" off buildings, cars, trees, etc. in proximity to the remote station. The multipath signals arrive at the remote station with a random set of phases, such that sometimes the signals add constructively, the signals are in phase, and extra power is received. Other times the signals add destructively, the signals are out of phase, tending to cancel each other out, and lower power is received. Cancellation can be such that for a high-scattering environment, the multipath signal power could drop in strength to $\frac{1}{100}$ its average value about 1% of the time. To compensate for the loss in power in the multipath signal, the base station would need to transmit 100 times as much power as if there was no fading in order to keep the receiver working 99% of the time.

There is therefore a need in the art for an effective way to combine signals in a remote station to maximize the usable signal.

SUMMARY

Embodiments disclosed herein address the above-stated needs by combining highly correlated signals in a remote station to maximize the usable signal.

A remote station for use in a wireless communication system includes a receiver and a compact, highly correlated, multi-element antenna. The multi-element antenna is configured to receive a signal from at least one base station. The receiver includes a search engine configured to receive the signals from each element of the antenna and determine a spatial signature, including the amplitude and phase of the signal received at each antenna element. The receiver also includes a weighting factor engine that determines a set of weighting factors for each base station signal in response to the spatial signatures of the received signals. A combiner, using the weighting factors, combines the signal received from each of the multi-elements in the antenna to produce an optimally combined signal.

DETAILED DESCRIPTION

Figure 1:
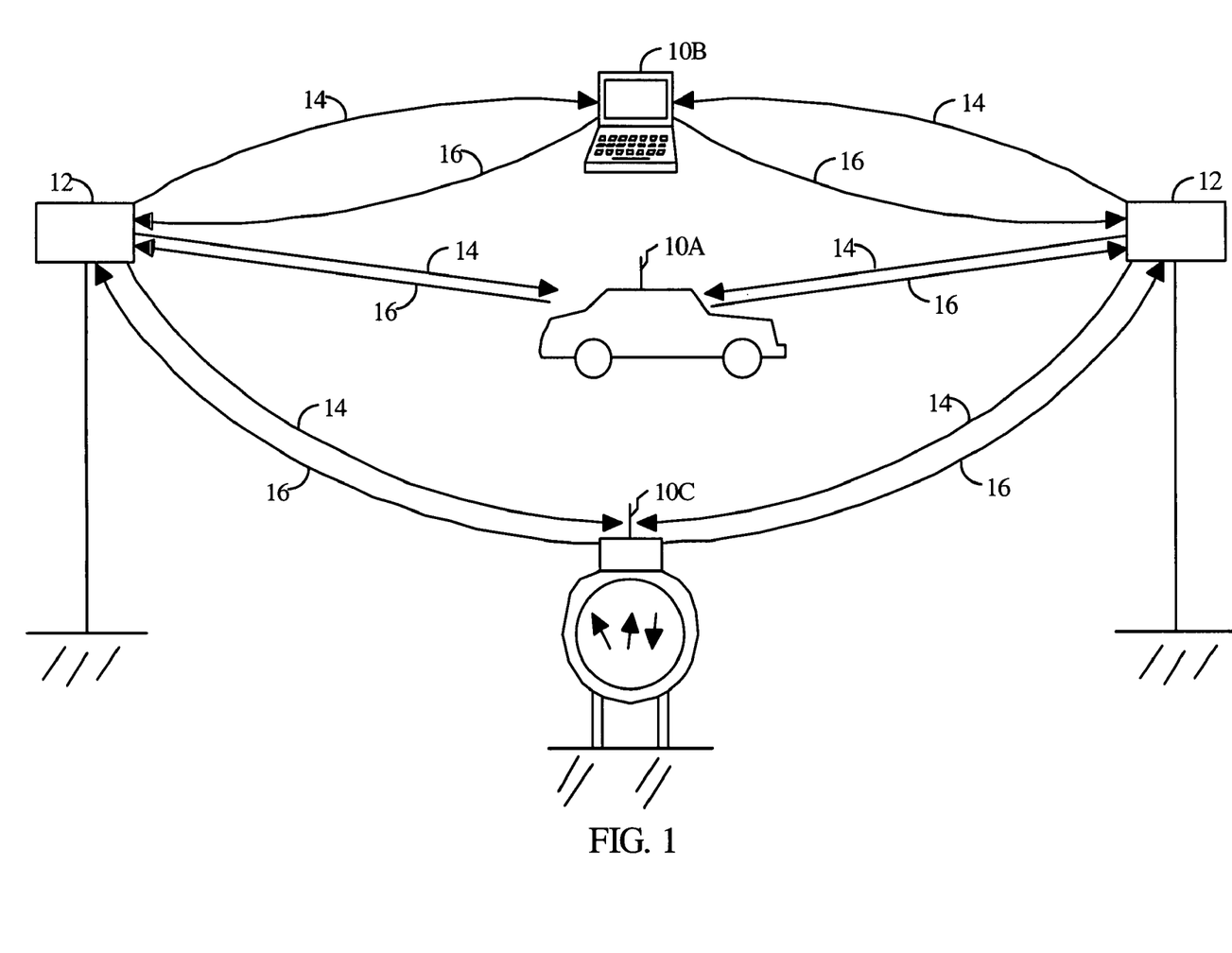
FIG. 1 is a representative diagram showing a typical modern wireless communication system.

A wireless communication system may comprise multiple remote stations and multiple base stations. FIG. 1 exemplifies an embodiment of a terrestrial wireless communication system with three remote stations 10A, 10B and 10C and two base stations 12. In FIG. 1, the three remote stations are shown as a mobile telephone unit installed in a car 10A, a portable computer remote station 10B, and a fixed location remote station 10C such as might be found in a wireless local loop or meter reading system. Remote stations may be any type of communication unit such as, for example, hand-held personal communication system units, portable data units such as a personal data assistant, or fixed location data units such as meter reading equipment. FIG. 1 shows a forward link 14 from the base station 12 to the remote stations 10 and a reverse link 16 from the remote stations 10 to the base stations 12.

Communication between the remote stations 10 and the base stations 12, over the wireless channel, can be accomplished using one of a variety of multiple access techniques which facilitate a large number of users in a limited frequency spectrum. These multiple access techniques include time division multiple access (TDMA), frequency division multiple access (FDMA), and code division multiple access (CDMA). An industry standard for CDMA is set forth in the TIA/EIA Interim Standard entitled "Mobile Station—Base Station Compatibility Standard for Dual-Mode Wideband Spread Spectrum Cellular System", TIA/EIA/IS-95, and its progeny (collectively referred to here as IS-95), the contents of which are incorporated by reference herein in their entirety.

Typically, in a wireless communication system signals are transmitted between a series of base stations and a plurality of remote stations. For example, each base station transmits signals to remote stations that are located within the base station's coverage area, also referred to as the base station cell. Remote stations located within a base station's coverage area generally communicate with that base station, the remote station's preferred base station. As a mobile remote station moves from a first base station's coverage area to a second base station's coverage area there is a hand-off. When performing a hand-off the remote station initiates communication with the second base station, and establishes the second base station as its preferred base station.

Figure 2:
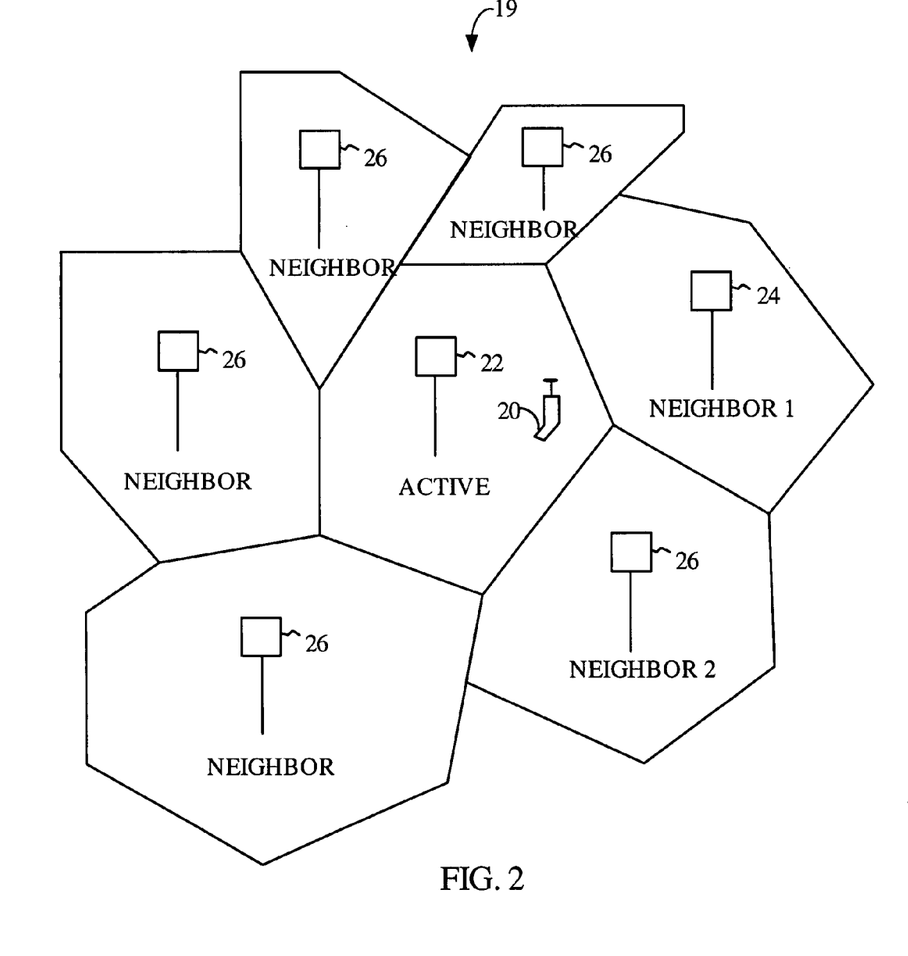
FIG. 2 is a representative diagram illustrating a cellular communication system.

FIG. 2 is a diagram illustrating the coverage areas of multiple base stations in a cellular based communication system, or network, 19. In FIG. 2, there is a remote station 20 located within the coverage area of a preferred base station 22. Also shown in FIG. 2 are neighboring base stations 24 and 26 and their respective coverage areas. As described above, as long as the remote station 20 remains within the coverage area of its preferred base station 22 the remote station 20 remains in communication with the preferred base station. If the remote station 20 relocates into the coverage area of another base station, such as neighboring base station 24, then the remote station establishes base station 24 as its preferred base station thereby performing a hand-off process. As the remote station travels through the cellular network 19 it will perform this hand-off process as it moves from the coverage area of one base station to another. Although the coverage areas in FIG. 2 are shown as Omni-directional, they may also be sectored, with the same base station using directional antennas to divide its coverage area into smaller portions.

In a wireless communication system, a communication signal may travel several distinct propagation paths as it propagates between a base station and a remote station. In the wireless channel, the multipath signal is created by reflection of the signal from obstacles in the environment such as, for example, buildings, trees, cars, and people. The multipath signal generated by the characteristics of the wireless channel presents a challenge to the communication system. One characteristic of a wireless channel suffering from multipath effects is the time spread introduced in a signal that is transmitted through the channel. For example, if an ideal impulse is transmitted over the wireless channel, the received signal appears as a stream of pulses with one pulse for each multiple propagation path. Another characteristic of the multipath channel is that each path through the channel may cause the signal to be affected by a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the received signal. For example, if an ideal impulse is transmitted over a multipath channel, each pulse of the received stream of pulses generally has a different phase than the other received pulses.

Accordingly, the wireless channel is generally a time varying multipath channel due to the relative motion of the structures that create the multipath. For example, if an ideal impulse is transmitted over the time varying multipath channel, the received stream of pulses changes in time delay, attenuation, and phase as a function of the time that the ideal impulse is transmitted.

The multipath characteristics of a wireless channel can affect the received signal and result in, among other things, fading of the signal. Fading is the result of the phasing characteristics of the multipath channel. A fade occurs when multipath vectors add destructively, yielding a received signal that is smaller in amplitude than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\pi$ radians, no signal is received at the output of the channel because the two signals, being of equal amplitude and opposite phase, cancel each other. Thus fading, a type of self-interference, or intra-cell interference, may have a severe negative effect on the performance of a wireless communication system.

Another characteristic of a cellular communication system is interference from signals transmitted by other base stations, or the same base station transmitted to a different sector of its coverage area, causing inter-cell interference. Inter-cell interference is generally greatest when the remote station is near a cell boundary, where the signal level of the preferred base station is usually weakest and the interfering signal from a neighboring base station is greatest.

Intra-cell and inter-cell interference limit the system capacity of the forward link of a wireless communication system. For example, in a communication system based on CDMA, signals from the same base station are separated by a set of orthogonal codes (Walsh codes), which tend to minimize the interference of other users' signals in the same base station cell. The other signal from the preferred base station, however, still create self-interference or fading. In addition, signals from neighboring base stations are identified by a special short pseudo-random noise (PN) code. All base stations use the same PN code, but with different shifts. However, due to nonzero autocorrelation there exists inter-cell interference.

One approach to address the fading problem that has been suggested is to have two separate antennas at a receiver. Separate antennas are structures that produce separate, or multiple, signals. Separate antennas may be distinct antennas or may be multiple elements within a single antenna array.

The approach of using two separate antennas at a receiver is based in part on the idea that both antennas will not generally receive a signal that is experiencing a "deep fade" at the same time. If the two antennas are completely uncorrelated, having no causal, or complementary, relationship to each other, then the affects of fading may be decreased by determining the antenna that has the strongest signal level and selecting the signal from that antenna for processing. In general the two antennas will not be completely uncorrelated, but typically there must be a low level of correlation, such as less than 0.7 envelope correlation. Envelope correlation is a commonly used metric of the correlation between two antennas. An envelope correlation of 1.0 indicates that the two antennas are completely correlated, producing identical output signals. An envelope correlation value of 0 indicates that the two antennas are completely un-correlated, with the output signals of the two antennas having no relationship to each other.

If the envelope correlation of the two antennas exceeds 0.7, then the signals received by both antennas are highly correlated and the antennas may receive signals that are experiencing a fade at the same time. Thus highly correlated antennas negate the effectiveness of two-antenna systems in a fading, multipath, communication environment.

A primary way to uncorrelated two antennas is by physically separating the two antennas. Separation of the two antennas may decrease correlation because the signal paths from the transmitter to each of the antennas is different. Due to the different signal paths, the multipath signals, or multipath vectors, will add differently at each antenna. The multipath vectors represent the amplitude and phase of the received multipath signal. Thus, although the multipath vectors may add destructively, yielding a received signal that is much smaller, a deep fade, at one antenna, the multipath vectors at the other antenna will be different, producing a different summation that will not suffer from a fade at the same time.

Typically, uncorrelation of antennas is achieved by separating the antennas from each other by at least $0.2\lambda$ of the communication signal where $\lambda$ is the wavelength of the signal. For a receiver that has uncorrelated antennas, several methods of combining the antenna output signals to maximize the received signal strength have been suggested. One method is commonly referred to as Maximal Ratio Combining (MRC) and is described in Smart Antennas for Wireless Communications: IS-95 and Third Generation CDMA Applications, by Joseph C. Liberti, Jr. and Theodore S. Rappaport, incorporated herein in its entirety. In the MRC method each of the signals received by the antennas has its magnitude and phase adjusted by a set of weighting terms. The adjusted signals are then combined. The weighting terms are selected to maximize the signal-to-noise-ratio (SNR) of the desired signal. However, the MRC method, does not provide the ability to reject interference signals because the weighting factors are selected to maximize the power of the desired signal, and in so doing may also increase the power of the interfering signals.

Another method of combining uncorrelated antenna signals is called Optimal Combining (OC) or "Wiener-Hopf." In OC, weighting factors are determined to maximize the quality of the signal, or the signal-to-interference ratio, produced by combining the signals received by the two antennas. See Smart Antennas for Wireless Communications: IS-95 and Third Generation CDMA Applications, by Joseph C. Liberti, Jr. and Theodore S. Rappaport. Selection of weighting factors has a significant impact on the ability to reject interference.

The methods of combining the signals received by two antennas described above have been used with uncorrelated antennas. However, remote station receivers, handsets in particular, are decreasing in size. The reduced size of the receiver makes it difficult to locate the antennas with sufficient separation ($0.2\lambda$) to produce uncorrelated antenna signals.

Figure 3:
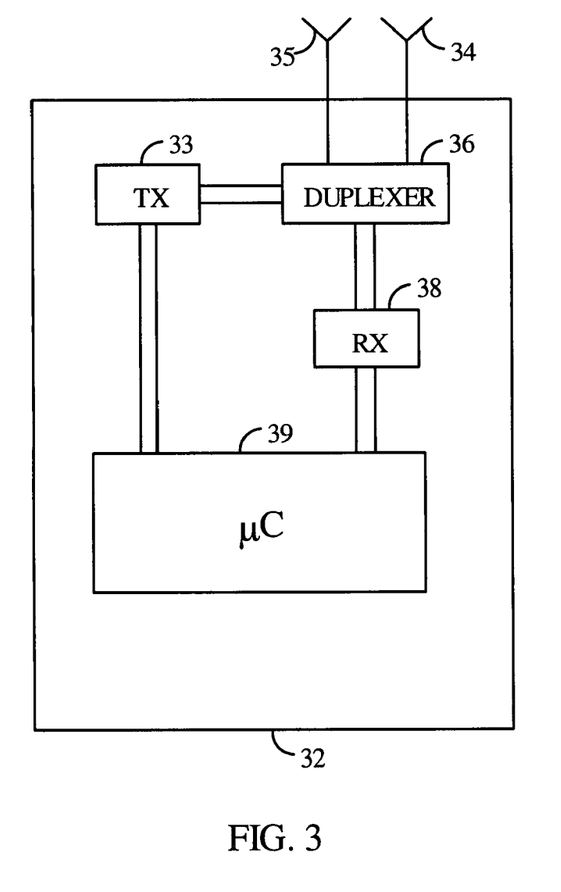
FIG. 3 is a block diagram showing a typical handset, with two highly correlated antennas.

FIG. 3 is a block diagram showing a typical handset 32, with two highly correlated antenna elements 34 and 35, in accordance with one embodiment. The two antenna elements 34 and 35 are connected to duplexer 36. The duplexer routes signals from a transmitter circuit 33 to the two antenna elements 34 and 35, or the duplexer routes signals from the two antennas to a receiver circuit 38. The transmitter circuit 33 and the receiver circuit 38 interface, and are controlled by, a controller 39. High correlation exists between the two antennas 34, 35 because the elements 34, 35 that make up the dual antennas are placed closely together.

While FIG. 3 shows two antenna elements 34, 35, the antenna may be made up of any desired number of elements. For example, a multi-antenna array may be made up of three antennas, four antennas, five antennas, or any desired number of antennas.

Figure 4:
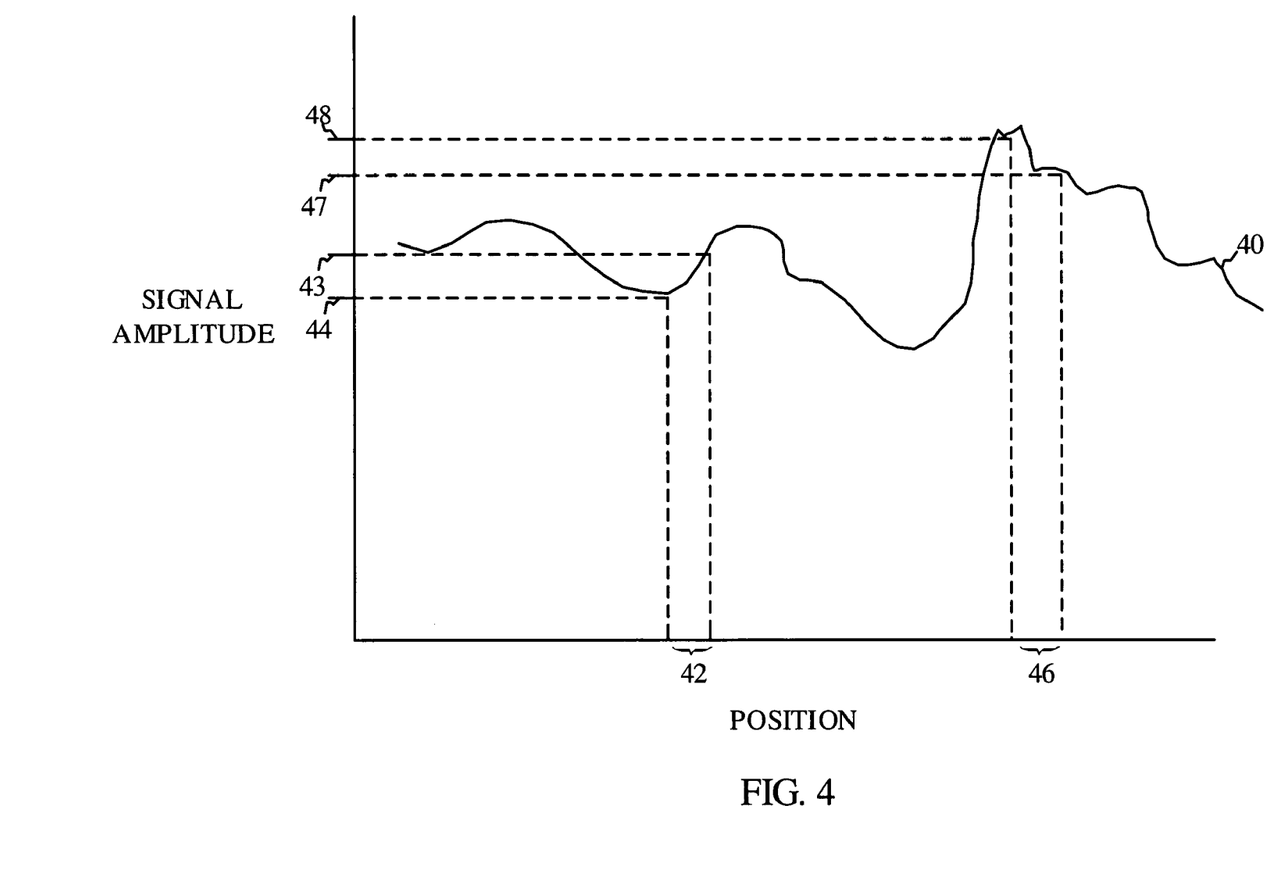
FIG. 4 is a representative graph illustrating the received signal strength at each antenna of a multi-antenna array.

FIG. 4 is a representative graph illustrating the interference field of a received multipath signal at each antenna of a multi-antenna array. In FIG. 4 the vertical axis represents the signal strength at various locations as represented by the horizontal axis. The interference field 40 shows multiple peaks and valleys, or fades, corresponding to areas of constructive and destructive summation of the multipath signal instances respectively. As illustrated in FIG. 4, if multiple antennas, for example two antennas, have adequate separation there is less likelihood that both antennas will be in a location where the interference field is in a fade.

For example, in FIG. 4 the signal strength at two different locations is shown for two antennas in an array. At a first location 42 the signal strength 43 at a first antenna is stronger that the signal strength 44 at a second antenna. Thus, the signal strength 44 at the second antenna is in a fade while the signal strength 43 at the first antenna is not in a fade. The difference in the signal strength received at the two antennas is due, in part, to the physical separation of the two antennas. As a receiver with the two antennas moves about, changing location, the signal levels at the two antennas will vary. For example, if the two antennas move to a second location 46 the signal strengths at the first and second antennas correspond to signal strengths 47 and 48 respectively. In this example, the relative signal strengths of the two antennas have reversed when the receiver moved from the first location 42 to the second location 46 such that the first antenna is in a fade and the second antenna is not in a fade at the second location 46.

As can be seen in FIG. 4, the physical separation of the antennas in an antenna array contributes to the antennas having different signal strengths and thus being uncorrelated. As the separation between the antenna in an antenna array decreases, the antenna correlation increases with both antennas receiving a signal strength becoming closer to the same strength. In a typical interference field, the smallest separation between peaks and valleys is on the order of $0.25\lambda$. A separation of $0.25\lambda$, or greater, is generally used between antennas in an antenna array and results in less than about 0.7 envelope correlation.

In a multipath environment, the antennas of a highly correlated antenna array are more likely to simultaneously experience a "deep fade." In a highly correlated antenna system there is a small phase difference between the signals received by each of the antennas. This results in the phase relationship of the multipath vectors received at the antennas being nearly the same. Therefore, if the multipath vectors of the received signal add destructively at one antenna, causing a deep fade, the vector summation of the multipath signals at the other antennas will likely also experience a deep fade.

In addition, highly correlated antennas do not have as high an "array gain" which is the ability to sum signals received from multiple antenna elements such that the desired signal is summed in phase, and interfering signals are summed incoherently. Typical interfering signals include neighboring base station signals, commonly called interferes, received by the antenna. A high array gain improves the ability of a receiver to reject interfering signals, and improves the receiver's ability to operate in a multipath environment. Conventionally, antennas designed to have high array gain and high diversity gain require the antenna elements to be uncorrelated. Typically, this requires large separation between the antennas or antenna elements.

In a wireless communication system, use of highly correlated antenna may be beneficial at both remote stations and base stations. In particular, in a remote station, multi-antenna systems will generally be highly correlated. For example a remote station, such as a handheld wireless communication receiver, imposes space limitations that may make it impractical to have adequate antenna separation to produce uncorrelated antennas.

A technique to improve the array and diversity gain of a highly correlated antenna includes receiving signals from the two antennas. In one embodiment, signals from each of the two antennas are processed by separate receiving circuitry. The outputs of the receiving circuits are then combined.

The complex signals at the outputs of the two antennas contain the amplitude and phase information of the signals. Using the complex signals, an estimate of the complex covariance matrix R is made.

Using the complex signals at the output of the two antenna receivers, an estimate of the complex spatial signature "c" of the desired signal is made. The complex spatial signature of a signal includes the signal amplitude and the angle-of-arrival (AOA) of the signal. In a communication system based on CDMA, a RAKE receiver is typically used. In a RAKE receiver an estimate of the complex spatial signature is performed separately for each signal that is assigned to a receiver element, or finger, of the RAKE. For each finger of the RAKE, determine a weight vector is determined in accordance with the following equation:

$$w=((R-Rs)^{-1})c$$

where Rs is the matrix formed by taking the outer-product of c with c-hermitian-conjugate. Alternatively, $w=R^{-1}c$ will give a similar result.

The weight vector is used to condition the signals received from the antennas before they are received by the RAKE receiver. The signal received by each finger of the RAKE receiver Vc(t) is conditioned such that:

$$Vc(t)=w1*V1(t)+w2*V2(t)$$

where V1(t) is the complex voltage stream of antenna 1, and V2(t) is the complex voltage stream of antenna 2. The weighting term w1* is the complex conjugate of the first element of w defined above. The weighting term w2* is the complex conjugate of the second element of w defined above.

Testing has indicated that the above technique may improve the sensitivity of a remote station receiver in a wireless communication system based on CDMA, through both diversity and interference gains, by about a factor of 2. Test results have also indicated that MRC combining gives significantly less gain in the situations tested.

The technique described above works with antennas that are spaced very close to each other and thus are highly correlated. The high correlation of the signals is accounted for in estimating the complex covariance matrix R. Thus, even though there is only a small difference between the two signals, weights may be selected to exploit this small difference. For example the weights selected as above will have the form:

$$w1=1+z, w2=-1+z \ OR \ w1=1-z, w2=-1-z$$

where z is a small, non-zero, complex number. The value of z is based, in part, on the amount of correlation between the two antennas. For example, two highly correlated antennas could result in a smaller value for z, while two less highly correlated antennas would result in a larger value for z.

For the example described above, there are two possible combined voltage streams that could be sent to the RAKE receiver. These two voltage streams correspond to the two possible sets of values of weighting terms. The corresponding voltage streams are:

$$VC1(t)=(V1(t)-V2(t))+z*(V1(t)+V2(t))$$

$$VC2(t)=(V1(t)-V2(t))-z*(V1(t)+V2(t))$$

The correlation between these two voltage streams is very low. The following description will help in understanding how the two highly correlated antenna signals have been conditioned so they are no longer correlated. Because the two antennas are highly correlated, V1(t) and V2(t) have a strong common mode. The strong common mode between V1(t) and V2(t) means that both signals, to a large extent, will change level together. Due to the strong common mode component in the two signals, the difference between the signals, V1(t)-V2(t), will be a small value. In addition, z is a small value. Thus, if the sum of the two signals is multiplied by $z(z*(V1(t)+V2(t)))$, the resulting product will be a small value. Both the value of $z*(V1(t)+V2(t))$ and the value of V1(t)-V2(t) are small, typically being approximately the same size.

Weighting and combining the two antenna signals produces a result that adds and subtracts roughly similar sized voltages. This technique exploits the small differences between the two antenna signals V1(t) and V2(t). Combining the two antenna signals in this manner produces conditioned signals VC1(t) and VC2(t) that have nearly completely uncorrelated fading characteristics. In addition, diversity is achieved by selecting the stronger of the two signals.

Figure 5:
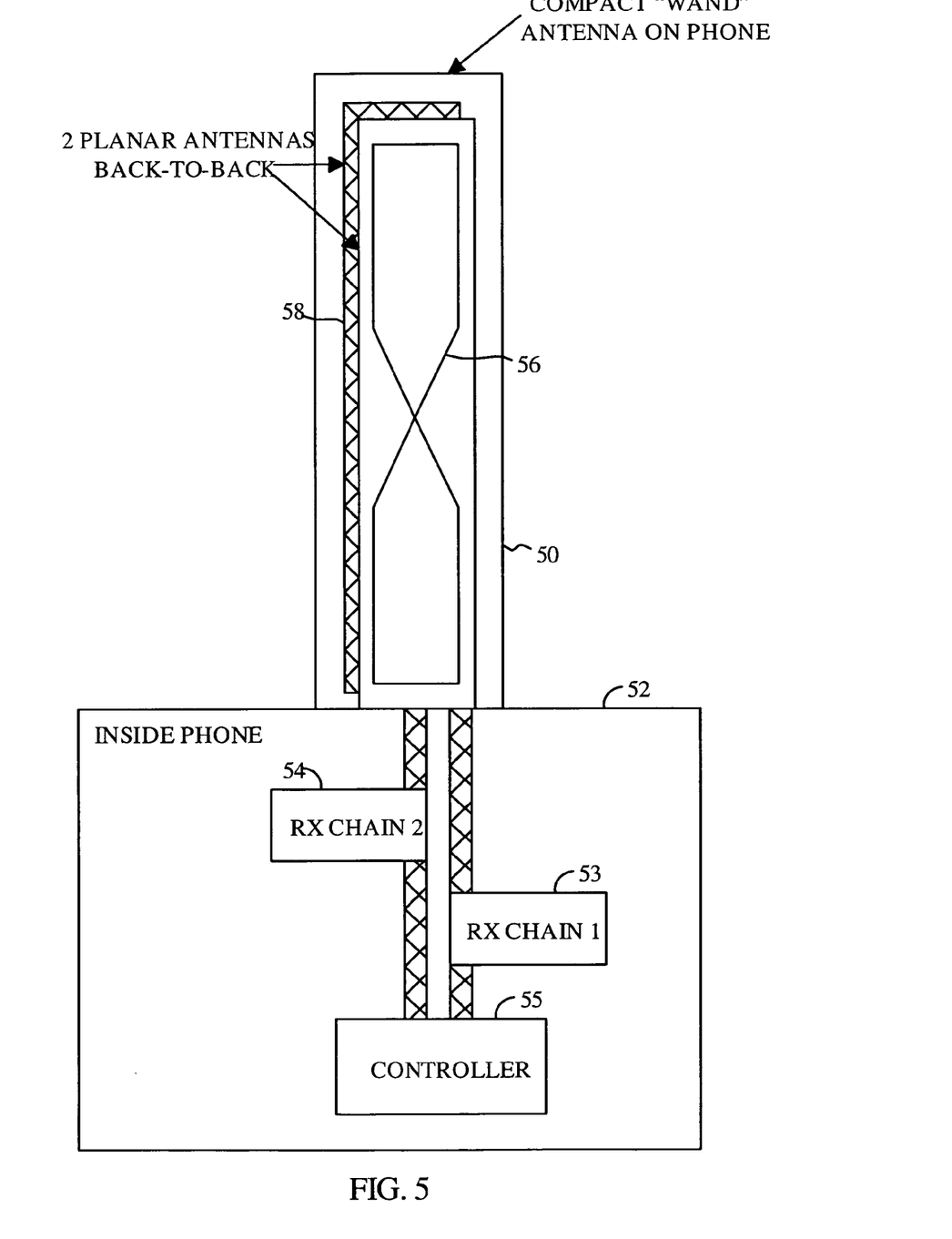
FIG. 5 is a block diagram illustrating one embodiment of a highly correlated antenna that could be used in a remote station.

FIG. 5 is an illustrative drawing of one embodiment of a highly correlated antenna 50 such as could be used in a remote station 52. The embodiment illustrated in FIG. 5 is a compact "wand" antenna. The antenna 50 is a dual element antenna and is mounted on the remote station 52. Internal to the remote station 52 are two receivers 53 and 54 corresponding to each of the elements of the antenna 50. The outputs of the receivers are connected to a controller 55 that has been adapted to receive multiple antenna inputs. The antenna 50 is made up of two planar antennas 56 and 58. The two antennas 56, 58 may be separated by a low dielectric constant spacer, for example polystyrene.

The two antennas 56, 58 may be separated by about 0.01 to 0.02 wavelengths. In one embodiment the two antennas 56, 58 are separated by 0.05 inches, corresponding to about 0.01 wavelengths at the design frequency.

In other embodiments, the antennas 56, 58 may be in different configurations, for example, adjacent whip antennas, a dual whip where the two antennas are in a single small plastic strip, dual-fed patches, adjacent stubbies, or a whip and co-axial stub antenna.

Figure 6:
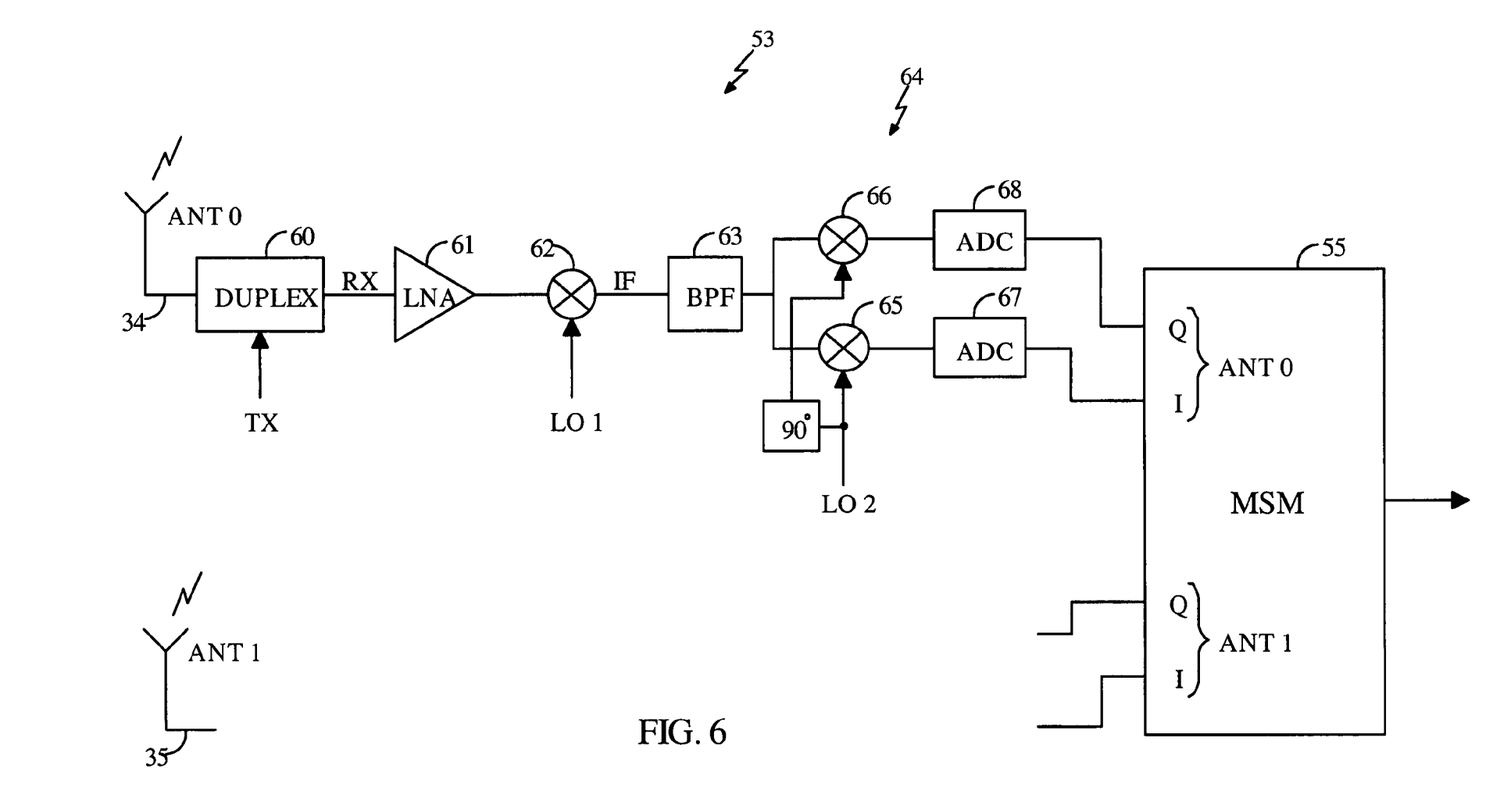
FIG. 6 is a block diagram of one embodiment of a dual antenna receiver in a remote station.

FIG. 6 is a block diagram of one embodiment of a dual antenna receiver in a remote station. Each antenna 34 and 35 is connected to a duplexer 60 (connections for antennas are not shown for simplicity). The duplexer 60 routes signals from a transmitter, not shown, to the two antennas 34, 35 and routes signals from the antennas 34, 35 to the receiver circuitry. The output of duplexer 60 is connected to a receiver chain 53. In the receiver chain 53, the output of the duplexer 60 is connected to a low noise amplifier 61 where it is amplified. The output of the low noise amplifier 61 is connected to a mixer 62. A second input to the mixer 62 is a first local oscillator. The mixer 62 combines the two signals and outputs an IF signal. The mixer 62 output is connected to a bandpass filter 63 where out-of-band components of the signal are attenuated. The band pass filter 63 output is connected to an Inphase/Quadrature (I/Q) detector 64.

In the I/Q detector 64 the bandpass filter output is routed to an inphase (I) mixer 65 and a quadrature (Q) mixer 66. A second input to the I mixer 65 is a second local oscillator. A second input to the Q mixer 66 is the second local oscillator, phase shifted by 90°. The I and Q mixers 65, 66 combine the bandpass filter 53 output and the second local oscillator signals and output baseband I and Q components of the received signal respectively. The I and Q components are routed to analog to digital converters (ADC) 67 and 68 where the signals are digitized. The digital outputs or ADCs 67 and 68 are routed to controller 55 antenna 0 and 1, I and Q, inputs respectively.

Figure 7:
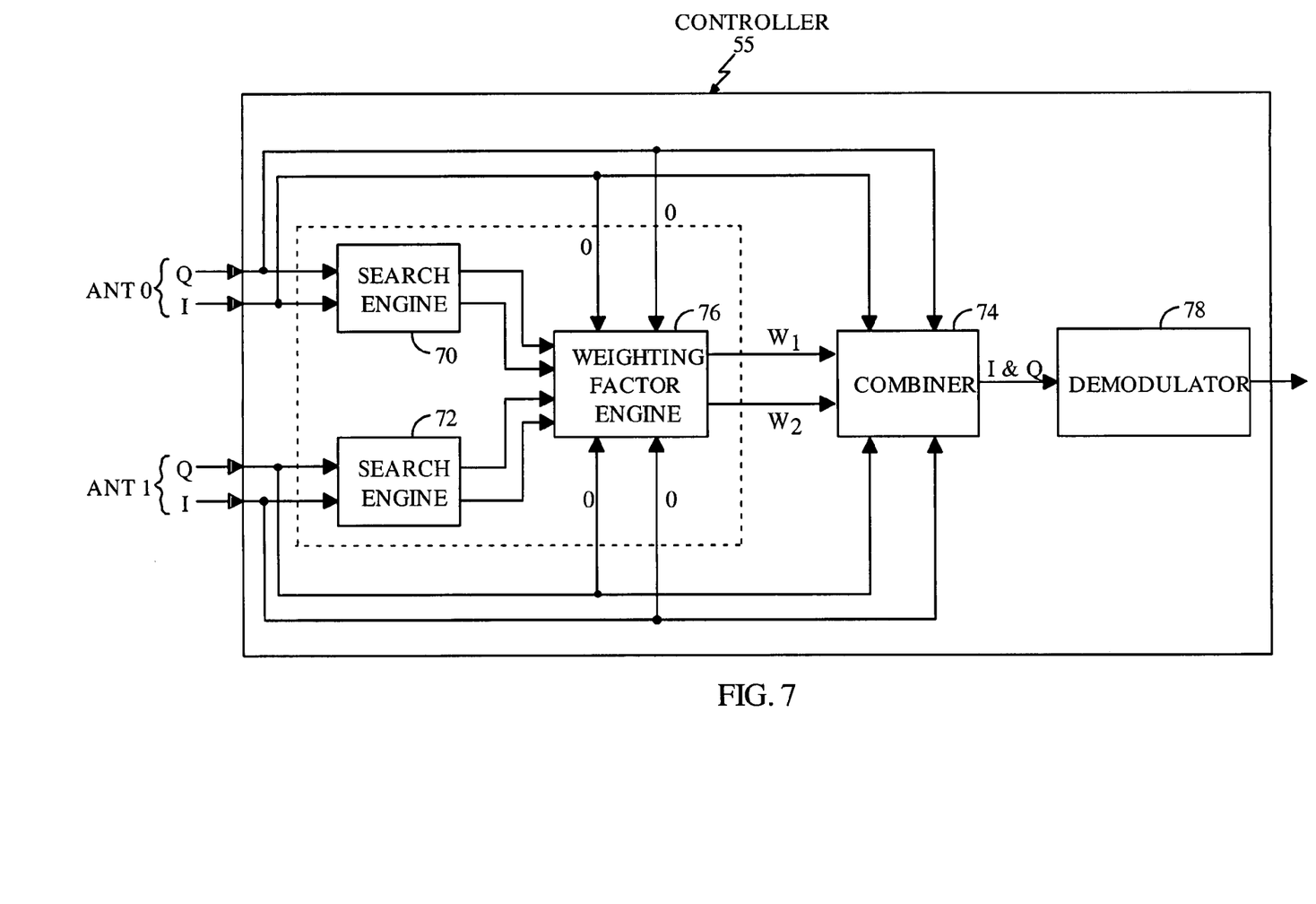
FIG. 7 is a block diagram of one embodiment of a controller adapted for use with a dual antenna receiver in a remote station.

FIG. 7 is a block diagram of one embodiment of the controller 55 adapted for use with a dual antenna receiver in the remote station. As described above, the I and Q components of the two antenna signals are input to the controller 55 at antenna 0 and antenna 1 inputs respectively. The I and Q signals from antenna 0 and antenna 1 are routed to search engines 70 and 72 respectively. In addition, the I and Q signals from the two antennas are routed to combiner 74. Within the search engines 70 and 72 the antenna signals are evaluated and the covariance and time delay of the signal carrying fingers, as well as the spatial signatures of the signals received by the fingers, are determined as described hereinabove and in accordance with known techniques.

The outputs of the search engines 70 and 72 are connected to a weighting factor engine 76 where a weighting factor is determined for each signal received by the fingers.

The combiner 74 receives the weighting factors $w_1$ and $w_2$ from the weighting factor engine 76. In addition, the combiner 74 receives the I and Q components of the two antenna signals. In accordance with one embodiment, the combiner 74 typically produces one of two possible voltage streams VC1(t) and VC2(t). The voltage stream with the higher signal-to-noise ratio is used. These two voltage streams are routed to a demodulator 78. In the demodulator 78 the two voltage streams are demodulated.

It should be understood that as used herein, the relationships of "antenna" to "antenna elements" and "antenna array" to "antenna" are the same. The two sets of terms have been interchangeably applied throughout the description.

The steps describing methods of implementing various aspects in accordance with the invention may be performed in differing order without departing from the scope of the invention. For example, the order that steps of a method of processing a multipath signal are performed may be changed without departing from the scope of the invention Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A remote station apparatus comprising:
   a multi-element antenna configured to receive signals from at least one transmitter and to output highly correlated signals from the respective transmitter;
   a controller configured to receive the highly correlated signals, to determine a spatial signature, including amplitude, angle of arrival and phase for each signal, to estimate a complex covariance matrix and to combine the correlated signals to reproduce the signal transmitted from a selected one of the at least one transmitter; and
   wherein the controller further comprises a weighting factor engine configured to determine a set of weighting factors for each of the at least one transmitter signals in response to the spatial signatures of the received signals and said complex covariance matrix, whereby said weighting factors may be determined in accordance with the following equation:

$w=((R-Rs)^{-1})c$, where w is the weighting factor, c is an estimate of said complex spatial signature, R is said complex covariance matrix, and Rs is the matrix formed by taking the outer product of said c with c-hermitian conjugate.

2. A remote station as defined in claim 1, wherein the multi-element antenna is a dual element antenna.

3. A remote station as defined in claim 1, wherein the multi-element antenna has an envelope correlation of greater than about 0.7.

4. A remote station as defined in claim 1, wherein the controller determines a spatial signature of each signal received from the at least one transmitter.

5. A remote station as defined in claim 1, wherein the controller further comprises a combiner configured to combine the received signals using the weighting factors to reproduce the signal from a selected one of the at least one transmitter.

6. A remote station as defined in claim 5, wherein the received signals are combined using an optimal combiner, wherein a signal to interference ratio is optimized.

7. A remote station as defined in claim 5, wherein the received signals are combined using a maximal combiner, wherein a signal to interference ratio is maximized.

8. A remote station as defined in claim 1, wherein the received signals are CDMA signals.

9. A remote station apparatus comprising:
 a multi-element antenna configured to receive signals from at least one transmitter and to output highly correlated signals from the respective transmitter;
 a controller configured to receive the highly correlated signals from the multi-element antenna to determine a spatial signature, including amplitude, angle of arrival and phase for each signal, to estimate a complex covariance matrix and to combine the correlated signals to maximize the ratio of a preferred signal amplitude to the signal amplitude of the other received signals; and
 wherein the controller further comprises a weighting factor engine configured to determine a set of weighting factors for each of the at least one transmitter signals in response to the spatial signatures of the received signals and said complex covariance matrix, whereby said weighting factors may be determined in accordance with the following equation:
 $w=((R-Rs)^{-1})c$, where w is the weighting factor, c is an estimate of said complex spatial signature, R is said complex covariance matrix, and Rs is the matrix formed by taking the outer product of said c with c-hermitian conjugate.

10. A remote station as defined in claim 9, wherein the multi-element antenna has an envelope correlation of greater than about 0.7.

11. A remote station as defined in claim 9, wherein the multi-element antenna is a dual element antenna.

12. A remote station as defined in claim 9, wherein the controller further comprises at least two search engines, each search engine configured to receive in-phase and quadrature signals from an antenna element.

13. A remote station as defined in claim 9, wherein the controller further comprises a combiner configured to receive in-phase and quadrature signals from each antenna element and weighting factors from a weighting factor engine, and output an optimized in-phase and quadrature signal.

14. A remote station as defined in claim 9, wherein the controller further comprises a demodulator configured to receive optimized in-phase and quadrature signals and output a demodulated signal.

15. A remote station as defined in claim 9, wherein the received signals are CDMA signals.

16. A wireless communication system comprising:
 at least one base station configured to transmit communication signals; and
 at least one remote station configured to receive communication signals from the at least one base station with a multi-element antenna wherein the received signals are highly correlated and are combined to reproduce the signal from a selected one of the at least one base station and configured to determine a spatial signature, including amplitude, angle of arrival and phase, for each signal and configured to estimate a complex covariance matrix, wherein the at least one remote station further comprises a controller configured to determine a spatial signature, including amplitude, angle of arrival and phase of each communication signal received from the at least one base station, to estimate a complex covariance matrix and to combine the correlated signals to reproduce the signal transmitted from a selected one of the at least one base station and wherein the controller further comprises a weighting factor engine configured to determine a set of weighting factors in response to the corresponding spatial signatures for each of the communication signals received and said complex covariance matrix, whereby said weighting factors may be determined in accordance with the following equation:
 $w=((R-Rs)^{-1})c$, where w is the weighting factor, c is an estimate of said complex spatial signature, R is said complex covariance matrix, and Rs is the matrix formed by taking the outer product of said c with c-hermitian conjugate.

17. A wireless communication system as defined in claim 16, wherein the multi-element antenna is a dual element antenna.

18. A wireless communication system as defined in claim 16, wherein the multi-element antenna has an envelope correlation of greater than about 0.7.

19. A wireless communication system as defined in claim 16, wherein the controller further comprises a combiner to combine the communication signals received using the weighting factors to reproduce the signal from a selected one of the at least one transmitter.

20. A wireless communication system as defined in claim 19, wherein the communication signals are combined using an optimal combiner, wherein a signal to interference ratio is optimized.

21. A wireless communication system as defined in claim 19, wherein the communication signals are combined using a maximal combiner, wherein a signal to interference ratio is maximized.

22. A wireless communication system as defined in claim 16, wherein the communication signals are CDMA signals.

23. A method of processing a multipath signal comprising:
 receiving signals from at least one transmitter at multiple antennas;
 estimating a complex covariance matrix;
 identifying a preferred transmitter among the at least one transmitter, from which a desired signal was received;
 producing a signal from each antenna such that the produced signals are highly correlated and contain signal components of a desired signal from the preferred transmitter, and interfering signals;

determining a spatial signature, including amplitude, angle of arrival and phase, for each signal;

combining two or more of the highly correlated signals to maximize the ratio of the desired signal amplitude to the interfering signal amplitude;

determining a set of weighting factors for each received signal in response to the spatial signatures of the received signals and said complex covariance matrix, whereby said weighting factors may be determined in accordance with the following equation: $w=((R-Rs)^{-1})c$, where w is the weighting factor, c is an estimate of said complex spatial signature, R is said complex covariance matrix, and Rs is the matrix formed by taking the outer product of said c with c-hermitian conjugate; and reproducing a signal corresponding to the desired signals received from the preferred transmitter using the weighting factors.

24. A method as defined in claim 23, wherein the received signals are combined using an optimal combiner, wherein a signal to interference ratio is optimized.

25. A method as defined in claim 23, wherein the received signals are combined using a maximal combiner, wherein a signal to interference ratio is maximized.

26. A method as defined in claim 23, wherein the received signals are CDMA signals.

27. A method of processing a signal in a wireless communication system, the method comprising:

receiving a signal from multiple transmitters with a highly correlated multi-element antenna;

estimating a complex covariance matrix;

determining a spatial signature, including amplitude, angle of arrival and phase, of each signal received from the multiple transmitters;

determining a set of weighting factors for each transmitter signal in response to the spatial signatures of the received signals and said complex covariance matrix, whereby said weighting factors may be determined in accordance with the following equation:

$w=((R-Rs)^{-1})c$, where w is the weighting factor, c is an estimate of said complex spatial signature, R is said complex covariance matrix, and Rs is the matrix formed by taking the outer product of said c with c-hermitian conjugate; and combining the received signals using the weighting factors to reproduce the signal from a selected one of the multiple transmitters.

28. A method as defined in claim 27, wherein the multi-element antenna is a dual element antenna.

29. A method as defined in claim 27, wherein the multi-element antenna has an envelope correlation of greater than about 0.7.

30. A method as defined in claim 27, wherein the received signals are combined using an optimal combiner, wherein a signal to interference ratio is optimized.

31. A method as defined in claim 27, wherein the received signals are combined using a maximal combiner, wherein a signal to interference ratio is maximized.

32. A method as defined in claim 27, wherein the received signals are CDMA signals.

33. A means for processing a signal in a wireless communication system, the method comprising:

means for receiving signals from at least one transmitter at multiple antennas;

means for estimating a complex covariance matrix;

means for identifying a preferred transmitter among the at least one transmitter, from which a desired signal was received;

means for producing a signal from each antenna such that the produced signals are highly correlated and contain signal components of a desired signal from the preferred transmitter, and interfering signals;

means for determining a spatial signature, including amplitude, angle of arrival and phase, for each signal;

means for determining a set of weighting factors for each received signal in response to the spatial signatures of the received signals and said complex covariance matrix, whereby said weighting factors may be determined in accordance with the following equation:

$w=((R-Rs)^{-1})c$, where w is the weighting factor, c is an estimate of said complex spatial signature, R is said complex covariance matrix, and Rs is the matrix formed by taking the outer product of said c with c-hermitian conjugate; and means for combining two or more of the highly correlated signals to maximize the ratio of the desired signal amplitude to the interfering signal amplitude.

34. A wireless communication system comprising:

means for transmitting communication signals from at least one base station;

means for receiving communication signals by at least one remote station, the remote station configured to receive communication signals with a multi-element antenna wherein the received signals are highly correlated and are combined to reproduce the signal from a selected one of the at least one base station;

means for estimating a complex covariance matrix;

means for determining a spatial signature, including amplitude, angle of arrival and phase, for each signal; and means for determining a set of weighting factors for each received signal in response to the spatial signatures of the received signals and said complex covariance matrix, whereby said weighting factors may be determined in accordance with the following equation:

$w=((R-Rs)^{31\ 1})c$, where w is the weighting factor, c is an estimate of said complex spatial signature, R is said complex covariance matrix, and Rs is the matrix formed by taking the outer product of said c with c-hermitian conjugate.

* * * * *